US007221255B2

(12) United States Patent
Johnson et al.

(10) Patent No.: US 7,221,255 B2
(45) Date of Patent: May 22, 2007

(54) EMBEDDED AUTOMOTIVE LATCH COMMUNICATIONS PROTOCOL

(75) Inventors: Curtis B. Johnson, Freeport, IL (US); Peter Suknaich, Belvedere, IL (US); Ajaykumar Vaidhyanathan, Chennai, TN (US)

(73) Assignee: Honeywell International Inc., Morriston, NJ (US)

( * ) Notice: Subject to any disclaimer, the term of this patent is extended or adjusted under 35 U.S.C. 154(b) by 182 days.

(21) Appl. No.: 10/791,929

(22) Filed: Mar. 2, 2004

(65) Prior Publication Data

US 2005/0195068 A1 Sep. 8, 2005

(51) Int. Cl.
*G06F 7/00* (2006.01)

(52) U.S. Cl. .................. 340/5.61; 340/5.62; 340/5.64; 340/5.72; 340/10.2; 340/5.5; 701/29; 701/33

(58) Field of Classification Search .............. 340/5.62, 340/5.61, 5.64, 5.72, 825.72, 825.69, 10.2, 340/5.5; 307/10.2; 701/29, 33
See application file for complete search history.

(56) References Cited

U.S. PATENT DOCUMENTS

| | | | | |
|---|---|---|---|---|
| 5,684,470 | A | 11/1997 | DeLand et al. | |
| 5,748,422 | A * | 5/1998 | Heaston et al. | 361/18 |
| 5,765,884 | A | 6/1998 | Armbruster | 292/216 |
| 5,975,596 | A | 11/1999 | Rogers, Jr. et al. | 292/216 |
| 6,007,118 | A | 12/1999 | Arabia, Jr. et al. | 292/216 |
| 6,028,537 | A * | 2/2000 | Suman et al. | 340/988 |
| 6,441,512 | B1 | 8/2002 | Jakel et al. | 307/10.2 |
| 6,474,706 | B1 | 11/2002 | Kalsi | 292/216 |
| 6,511,107 | B2 | 1/2003 | Barczynski et al. | 292/216 |
| 6,520,548 | B1 | 2/2003 | Fisher et al. | 292/201 |
| 6,568,722 | B2 | 5/2003 | Raffelsiefer et al. | 292/216 |
| 6,575,507 | B2 | 6/2003 | Reddmann | 292/216 |
| 6,577,226 | B1 * | 6/2003 | Steiner | 340/5.62 |
| 6,601,883 | B1 | 8/2003 | Kalsi | 292/216 |
| 6,732,031 | B1 * | 5/2004 | Lightner et al. | 701/33 |
| 2002/0125994 | A1 | 9/2002 | Sandau | 340/5.62 |
| 2002/0180274 | A1 | 12/2002 | Suman | 307/10.2 |
| 2003/0043021 | A1 | 3/2003 | Chung | 340/5.71 |
| 2003/0167345 | A1 * | 9/2003 | Knight et al. | 709/249 |
| 2003/0182863 | A1 | 10/2003 | Mejean et al. | 49/26 |

FOREIGN PATENT DOCUMENTS

| | | |
|---|---|---|
| WO | WO 93/14571 | 7/1993 |
| WO | WO 96/05552 | 2/1996 |
| WO | WO 03/069566 A2 | 8/2003 |

* cited by examiner

*Primary Examiner*—Brian Zimmerman
*Assistant Examiner*—Vernal Brown
(74) *Attorney, Agent, or Firm*—Luis M. Ortiz; Kermit D. Lopez

(57) ABSTRACT

A latch communications method and system are disclosed herein, which generally includes a communications receiver and transmitter unit associated with a latch. Additionally, an interface component is provided for interfacing with the communications receiver and transmitter unit, wherein the interface component is co-located with the communications receiver and transmitter unit in association with the latch. Also, an interpreter is associated with the interface component and the communications and transmitter unit, wherein the interpreter processes information received from the communications receiver and transmitter unit in order to provide latch diagnostics and functionalities.

20 Claims, 3 Drawing Sheets

EMBEDDED AUTOMOTIVE LATCH COMMUNICATIONS PROTOCOL

TECHNICAL FIELD

Embodiments are generally related to door latch assemblies, including door latching mechanisms utilized in automobiles and other vehicles. Embodiments are also related to techniques for automatically and remotely controlling and diagnosing vehicle door latches.

BACKGROUND OF THE INVENTION

Latching mechanisms are utilized in a variety of commercial and industrial applications, such as automobiles, airplanes, trucks, and the like. For example, an automotive closure, such as a door for an automobile passenger compartment, is typically hinged to swing between open and closed positions and conventionally includes a door latch that is housed between inner and outer panels of the door. The door latch functions in a well-known manner to latch the door when it is closed and to lock the door in the closed position or to unlock and unlatch the door so that the door can be opened manually.

The door latch can be operated remotely from inside the passenger compartment by two distinct operators—a sill button or electric switch that controls the locking function and a handle that controls the latching function. The door latch is also operated remotely from the exterior of the automobile by a handle or push button that controls the latching function. A second distinct exterior operator, such as a key lock cylinder, may also be provided to control the locking function, particularly in the case of a front vehicle door. Each operator is accessible outside the door structure and extends into the door structure where it is operatively connected to the door latch mechanism by a cable actuator assembly or linkage system located inside the door structure.

Vehicles, such as passenger cars, are therefore commonly equipped with individual door latch assemblies which secure respective passenger and driver side doors to the vehicle. Each door latch assembly is typically provided with manual release mechanisms or lever for unlatching the door latch from the inside and outside of the vehicle, e.g. respective inner and outer door handles. In addition, many vehicles also include an electrically controlled actuator for remotely locking and unlocking the door latches.

One of the problems inherent with conventional latching mechanisms is that such devices are increasingly becoming complicated due to the addition of on-board electronics. In order to perform latch diagnostics and/or active debugging without interfacing with the complexities of a vehicle computer, a bi-directional communications protocol, including systems which utilize such a protocol, should be implemented. To date, however, such protocols and systems have not been implemented in the context of latching devices, such as vehicle door latch assemblies.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved latch control and diagnostic mechanism.

It is another aspect of the present invention to provide for improved latching systems and methods for use in automobiles and other vehicles.

The aforementioned aspects of the invention and other objectives and advantages can now be achieved as described herein. A latch communications method and system are disclosed herein, which generally includes a communications receiver and transmitter unit associated with a latch. Additionally, an interface component is provided for interfacing with the communications receiver and transmitter unit, wherein the interface component is co-located with the communications receiver and transmitter unit in association with the latch. Also, an interpreter is associated with the interface component and the communications and transmitter unit, wherein the interpreter processes information received from the communications receiver and transmitter unit in order to provide latch diagnostics and functionalities.

The communications receiver and transmitter unit additionally can be configured to include a wireless communications component for wirelessly communicating with a host computer. By implementing these aforementioned components, a bi-directional protocol can be utilized for receiving latch status and operation information and data during of the latch's operation cycles (i.e., static or dynamic), while providing for the transmission of any latch command, thereby permitting active debugging of the latch without the necessity of resorting to an on-board vehicle computer.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
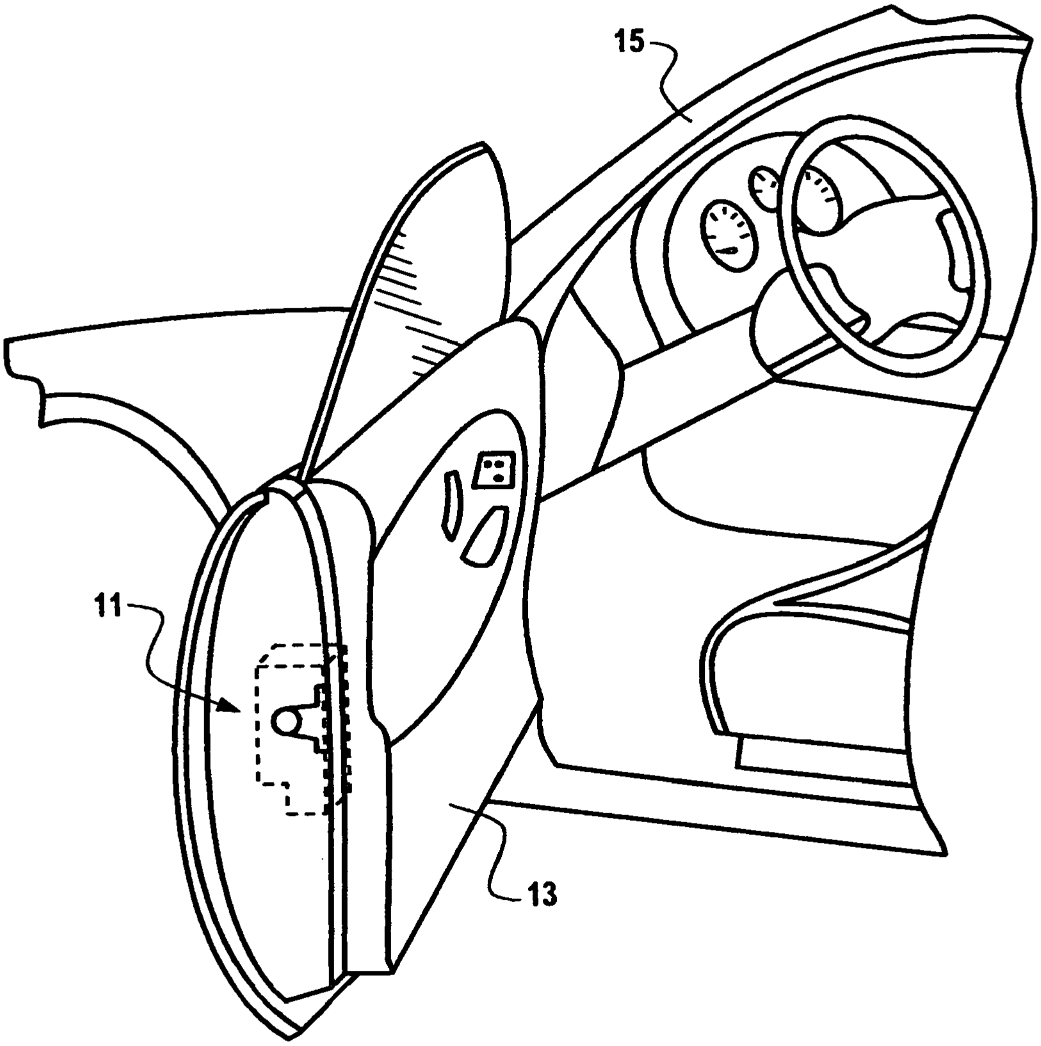
FIG. 1 illustrates a perspective view of a vehicle door mounted to a passenger vehicle in which a preferred embodiment of the present invention can be implemented.

FIG. 1 illustrates a perspective view of a vehicle door 13 mounted to a passenger vehicle in which a preferred embodiment of the present invention can be implemented. A vehicle, such as an automobile can be equipped with one or more individual door latch assemblies 11, which secure respective passenger and driver side doors to the vehicle 15. Each door latch assembly 11 is typically provided with manual release mechanisms or lever for unlatching the door latch from the inside and outside of the vehicle, e.g. respective inner and outer door handles. In addition, many vehicles can also be equipped with electrically controlled actuators for remotely locking and unlocking the door latches. As indicated in FIG. 1, a door latch assembly 11 can be mounted to a driver's side vehicle door 13 of a passenger vehicle 15. The door latch assembly 11 may be mounted to front and rear passenger side doors thereof and may be incorporated into a sliding side door, rear door, a rear hatch or a lift gate thereof, depending upon design constraints.

Figure 2:
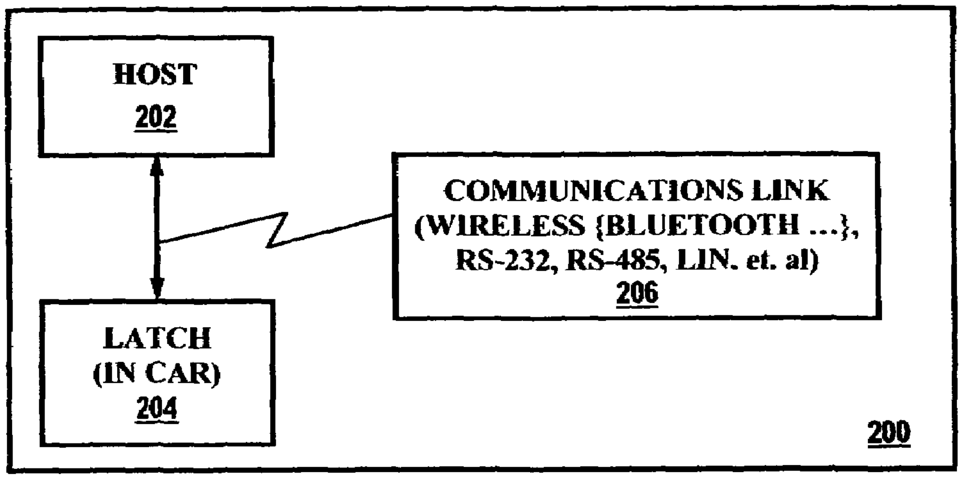
FIG. 2 illustrates a block diagram of a system, which can be implemented in accordance with a preferred embodiment of the present invention.

FIG. 2 illustrates a block diagram of a system 200, which can be implemented in accordance with a preferred embodiment of the present invention. System 200 includes a host computer 202, which can communicate via a wireless communications link 206 with a vehicle door latch 204 of an automobile, such as the vehicle depicted in FIG. 1. Latch 204 is therefore analogous to door latch assembly 11 depicted in FIG. 1. Latch 204 is described and illustrated in greater detail in FIG. 3.

Figure 3:
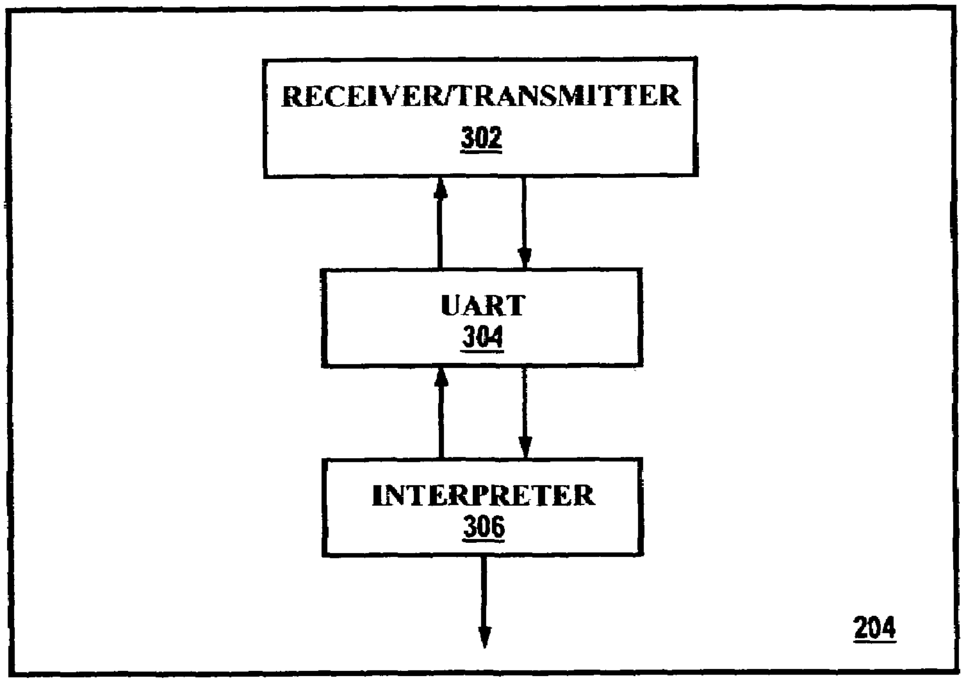
FIG. 3 illustrates a block diagram of a portion of the system depicted in FIG. 2, in accordance with a preferred embodiment of the present invention.

FIG. 3 illustrates a block diagram of a portion of the system 200 depicted in FIG. 2, in accordance with a preferred embodiment of the present invention. FIG. 3 specifically depicts latch 204 of FIG. 2 in greater detail, showing additional components of system 200. Thus, latch 204 can in and of itself be implemented as a system that includes a number of components for enabling the control and diagnostics of a vehicle door latch. Latch 204 generally includes a communications receiver and transmitter unit 302, which is associated with latch 204.

Latch 204 also can include an interface component 304 for interfacing with the communications receiver and transmitter unit 302, wherein the interface component is co-located with the communications receiver and transmitter unit 302. Additionally, latch 204 includes an interpreter 306, which is generally associated with the interface component 304, and the communications and transmitter unit 302. The interpreter 306 can processes information received from the communications receiver and transmitter unit 302 in order to provide latch diagnostics and functionalities for latch 204.

The communications receiver and transmitter unit 302 can be configured to comprise a wireless communications component for wirelessly communicating with host computer 202 depicted in FIG. 2. Such a wireless communications component can include, for example, an antenna and associated wireless communications circuitry for receiving and transmitting data per a desired frequency. Alternatively, the communications receiver and transmitter unit 302 can comprises a direct wire connection for communicating data to and from the interpreter 306. Such a direct wire connection can be implemented in the context of a voltage level shifter for transforming voltage levels for communication with the interface component 304.

The interface component 304 can be configured as a Universal Asynchronous Receiver/Transmitter (UART), which can receive and transmit data serially from the communications receiver and transmitter unit 302 and receive and transmit data in parallel with the interpreter 306. The UART can be implemented a hardware component separate from the interpreter 306. Alternatively, the UART can be integrated with the interpreter 306. The interpreter 306 can be implemented a microprocessor that processes data received from the UART, or as a logic array that performs a particular function based on particular data received from the UART.

The interpreter 306 is essentially the "brains" or the end user of the information provided by the UART in association with the communications receiver and transmitter unit 302. Interpreter 306 generally provides latch diagnostic information to a user and/or performs latch functionality via alternative communication links, such as, for example, wireless, Bluetooth, 802-11, RS-232, RS-485, LIN, and so forth.

The embodiments of FIGS. 1-3 solve the problems associated with the increasingly complicated automobile latches present with addition of on-board electronics. In order to perform latch diagnostics and/or active debugging without interfacing with the complexities of a vehicle computer, a bi-directional communications protocol must be implemented, which is indicated in FIGS. 1-3 herein. Such a protocol allows for the receiving of latch status and operational information and data during any of its operational cycles (e.g., static or dynamic). Such a protocol also allows for the transmitting of any latch command, thereby permitting active debugging without the use of a vehicle computer.

A general packet format can be implemented in association with the protocol and configuration of FIGS. 1-3. For example, the following definition can be utilized for each packet communicated between the components of latch 204 as depicted in FIG. 3 and the host computer 202 shown in FIG. 2:

| Byte | Field Name | Size | Comments |
|---|---|---|---|
| 1 | Header #1 | 1 | Packet Header #1 |
| 2 | Header #2 | 1 | Packet Header #2 |
| 3 | Packet Length | 1 | Length of Type and Data |
| 4 | Packet Type | 1 | Type of Packet |
| 5 | Data | Variable | 0 to n bytes of packet data |
| N | Check Sum | 1 | Sum of all the bytes in the packet |

Such a format can be used for packets transmitted from the Latch 204 to the Host computer 202 and/or host system, and also for packets transmitted from the host computer 202 and/or host System to the latch 204.

Two separate packet types can be transmitted from the latch 204 to the host system. Such packet types can be either Debug Information, or Version Information. The Packet Type field is encoded as a "101" for Debug Packets and "102" for Version Packets.

The purpose of the debug information packet is to transmit the current state of the embedded software to the host for Debug Information purposes as indicated below:

| Field Name | Contents |
|---|---|
| Header #1 | 0xAA |
| Header #2 | 0x55 |
| Packet Length | 24 |
| Packet Type | 101 - Debug Information Packet Type Code |
| Data | 23 bytes of data as follows |
| | 2 bytes of ring magnet position |
| | 1 byte of current sensor data |
| | 2 bytes of time value #1 |
| | 2 bytes of time value #2 |
| | 2 bytes of time value #3 |
| | 2 bytes of time value #4 |
| | 1 byte of motor data |
| | 1 byte of PWM value |
| | 2 bytes of current timer tick |
| | 2 bytes of analog data |
| | 1 byte of misc. debug byte data #1 |
| | 1 byte of misc. debug byte data #2 |
| | 2 bytes of misc. debug integer data #1 |
| | 2 bytes of misc. debug integer data #2 |
| Check Sum | the summation of all the bytes in the packet |

The purpose of the version information packet is to transmit the current embedded software version number to the host, as indicated below:

| Field Name | Contents |
| --- | --- |
| Header #1 | 0xAA |
| Header #2 | 0x55 |
| Packet Length | 13 |
| Packet Type | 102 - Version Information Packet Type Code |
| Data | 12 bytes of Embedded System Version number in ASCII |
| Check Sum | the summation of all the bytes in the packet |

Nine separate packet types may be transmitted from the Host system to the latch 102. These packet types can be as follows:

| Packet Type | Encoded Value |
| --- | --- |
| Go to Super Lock Position | 1 |
| Go to Lock Position | 2 |
| Go to Ready Position | 3 |
| Go to Open Position | 4 |
| Abort Current Operation | 6 |
| Turn Debug ON | 8 |
| Turn Debug OFF | 9 |
| Run the motor in Manual Mode | 10 |
| Override the current sensor values | 11 |

The purpose of the Go to Super Lock Position packet is command the latch to go to the super lock position. The command is refused if the latch 102 is not currently in the proper position to accept the command. Recall that latch 102 is also analogous to latch assembly 11 of FIG. 1.

| Field Name | Contents |
| --- | --- |
| Header #1 | 0xBB |
| Header #2 | 0x66 |
| Packet Length | 1 |
| Packet Type | 1 - Go to Super Lock Position |
| Check Sum | the summation of all the bytes in the packet |

The purpose of the Go to Lock Position packet is command the latch to go to the lock position. The command is refused if the latch is not currently in the proper position to accept the command.

| Field Name | Contents |
| --- | --- |
| Header #1 | 0xBB |
| Header #2 | 0x66 |
| Packet Length | 1 |
| Packet Type | 2 - Go to Lock Position |
| Check Sum | the summation of all the bytes in the packet |

The purpose of the Go to Ready Position packet is command the latch to go to the ready position. The command is refused if the latch is not currently in the proper position to accept the command.

| Field Name | Contents |
| --- | --- |
| Header #1 | 0xBB |
| Header #2 | 0x66 |
| Packet Length | 1 |
| Packet Type | 3 - Go to Ready Position |
| Check Sum | the summation of all the bytes in the packet |

The purpose of the Go to Open Position packet is command the latch to go to the open position. The command is refused if the latch is not currently in the proper position to accept the command.

| Field Name | Contents |
| --- | --- |
| Header #1 | 0xBB |
| Header #2 | 0x66 |
| Packet Length | 1 |
| Packet Type | 4 - Go to Open Position |
| Check Sum | the summation of all the bytes in the packet |

The purpose of the Abort Current Operation packet is command the latch to halt the current operation in progress in the latch.

| Field Name | Contents |
| --- | --- |
| Header #1 | 0xBB |
| Header #2 | 0x66 |
| Packet Length | 1 |
| Packet Type | 6 - Abort Current Operation |
| Check Sum | the summation of all the bytes in the packet |

The purpose of the Turn Debug On packet is to command the latch to begin sending internal debug information to the host system.

| Field Name | Contents |
| --- | --- |
| Header #1 | 0xBB |
| Header #2 | 0x66 |
| Packet Length | 1 |
| Packet Type | 8 - Turn Debug ON |
| Check Sum | the summation of all the bytes in the packet |

The purpose of the Turn Debug Off packet is to command the latch to stop sending internal debug information to the host system.

| Field Name | Contents |
| --- | --- |
| Header #1 | 0xBB |
| Header #2 | 0x66 |
| Packet Length | 1 |
| Packet Type | 9 - Turn Debug OFF |
| Check Sum | the summation of all the bytes in the packet |

The purpose of the Run motor in manual mode packet is to command the latch to run the motor as commanded.

| Field Name | Contents |
|---|---|
| Header #1 | 0xBB |
| Header #2 | 0x66 |
| Packet Length | 3 |
| Packet Type | 10 - Run the motor in Manual Mode |
| Data | 2 bytes of data as follows |
| | 1 byte of Motor Direction |
| | 1 = Clockwise |
| | 2 = Counter Clockwise |
| | 1 byte of motor PWM value in percent |
| Check Sum | the summation of all the bytes in the packet |

The purpose of the Override the current sensor values packet is to command force the values of the sensors as commanded in the packet.

| Field Name | Contents |
|---|---|
| Header #1 | 0xBB |
| Header #2 | 0x66 |
| Packet Length | 7 |
| Packet Type | 11 - Override the current sensor values |
| Data | 6 bytes of data as follows |
| | 1 byte of External Handle command |
| | '1' = Force sensor always ON |
| | '0' = Force sensor always OFF |
| | 'N' = Restore sensor to Normal mode |
| | 1 byte of Sill Knob command |
| | '1' = Force sensor always ON |
| | '0' = Force sensor always OFF |
| | 'N' = Restore sensor to Normal mode |
| | 1 byte of Internal Handle command |
| | '1' = Force sensor always ON |
| | '0' = Force sensor always OFF |
| | 'N' = Restore sensor to Normal mode |
| | 1 byte of Key Lock command |
| | '1' = Force sensor always ON |
| | '0' = Force sensor always OFF |
| | 'N' = Restore sensor to Normal mode |
| | 1 byte of Claw 1st Click command |
| | '1' = Force sensor always ON |
| | '0' = Force sensor always OFF |
| | 'N' = Restore sensor to Normal mode |
| | 1 byte of Claw closed command |
| | '1' = Force sensor always ON |
| | '0' = Force sensor always OFF |
| | 'N' = Restore sensor to Normal mode |
| | 1 byte of motor PWM value in percent |
| | '1' = Force sensor always ON |
| | '0' = Force sensor always OFF |
| | 'N' = Restore sensor to Normal mode |
| Check Sum | the summation of all the bytes in the packet |

Figure 4:
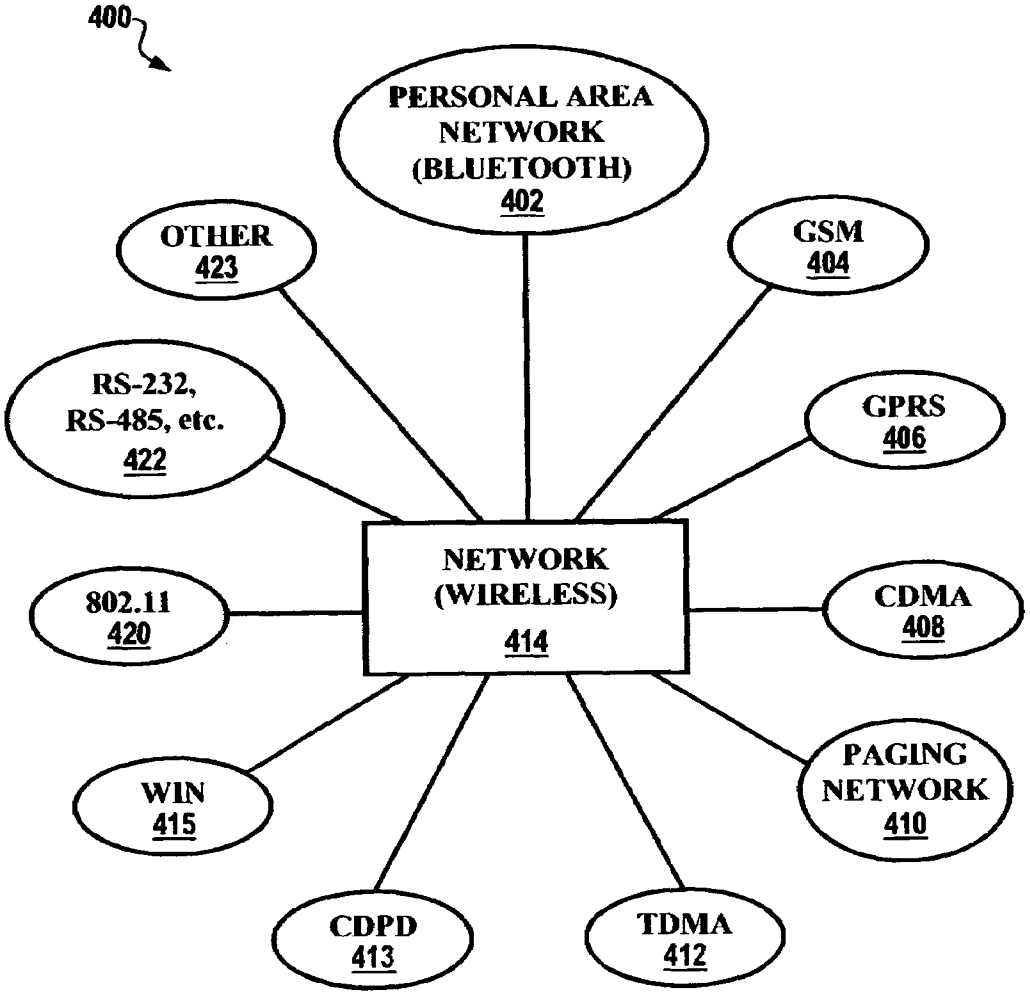
FIG. 4 illustrates an entity diagram illustrating possible attributes for a wireless network, which can be implemented in accordance with preferred or alternative embodiments of the present invention.

FIG. 4 illustrates an entity diagram 400 illustrating possible attributes for a wireless network, which can be implemented in accordance with preferred or alternative embodiments of the present invention. As indicated in FIG. 2, host computer 202 (i.e., host system) can communicate with latch 204 (and the components embedded therein) via a communications link 206, which can be implemented in the context of a wireless network, such as, for example, wireless network depicted in FIG. 4.

A variety of possible wireless communications and networking configurations may be utilized to implement wireless network 414. Wireless network 414 may be, for example, implemented according to a variety of wireless protocols, including satellite, cellular, and direct RF or IR communications. Satellite communications, for example, well known in the art and can be implemented in combination with a network. Wireless network 414 can be implemented as a single network type (e.g., Bluetooth) or a network based on a combination of network types (e.g., GSM, CDMA, etc).

Wireless network 414 can be configured as a CDPD (Cellular Digital Packet Data) network 413, well-known in the networking arts. CDPD may be configured as a TCP/IP based technology that supports Point-to-Point (PPP) or Serial Line Internet Protocol (SLIP) wireless connections. Cellular service is generally available throughout the world from major service providers. Data can be transferred over switched PSTN circuits or packet-switched network utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 414 can be also configured as a Personal Area Network 402 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS) and embedded into support devices.

The Bluetooth standard permits up to 100 mw of power, which can increase the range to 100 M. In addition, Bluetooth can support up to three voice channels. Utilizing short data packets and frequency hopping of up to 1600 hops per second, Bluetooth is a wireless technology that can be utilized to enable the implementation of the method and system described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 414 can also be configured as a GSM network 404. GSM (Global System for Mobile Communication) and PCS (Personal Communications Systems) networks, both well-known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that such new developments can be implemented in accordance with the present invention.

Wireless network 414 can be also implemented as a GPRS network 406. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well-known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 414 can be implemented as a CDMA network 408. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 414 can also be configured with a form of CDMA technology known as wideband CDMA (W-CDMA). Wideband CDMA may be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 414 can be also implemented as a paging network 410. Such paging networks, well-known in the telecommunications arts, can be implemented in accordance with the present invention to enable transmission or receipt of data over the TME/X protocol, also well-known in the telecommunications arts. Such a protocol enables notification in messaging and two-way data coverage utilizing satellite technology and a network of base stations geographically located throughout a particular geographical region. Paging network 410 can be configured to process enhanced messaging applications.

Unified messaging solutions can be utilized in accordance with wireless network 414 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the present invention, but are described herein for illustrative purposes only. It is anticipated that such paging networks, including those based on the TME/X protocol, will be continually developed and that such new developments can be implemented in accordance with the present invention.

Wireless network 414 can also be configured as a TDMA network 412. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user may be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 414 can also be configured as a WIN (Wireless Intelligent Network) 415. WIN is generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semi-permanent mobile subscriber (wireless device user) information for wireless carriers' entire subscriber base.

HLR subscriber information includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR may be also configured as a database that contains temporary information concerning the mobile subscribers currently located in a given MSC serving area, but whose HLR may be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications. Such systems and standards may be utilized to implement wireless network 414. Additionally, wireless network 414 can be implemented as an 802.11 wireless network 420 and/or as a wireless network 422 based on RS-232, RS-484, and/or other types of wireless communications protocols.

Wireless network 414 can also be implemented as any one of a number of other types of wireless networks 423. Examples of such "other" types of wireless networks include, IMT2000 and its derivatives, CDMA2000, SMS, EMS, MMS, Wireless Application Protocol (WAP), Embedded Web server with SMTP and HTTP interface on Higher Layers (application Layer), GPS, IRDA, Imode, CAN, Safety Bus, and the like.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

Having thus described the invention what is claimed is:

1. A vehicle door latch communications system, comprising:

a communications receiver and transmitter unit associated with a vehicle door latch, wherein said communications receiver and transmitter unit comprises a wireless communications component for communicating with a host computer via a wireless network;

an interface component for interfacing with said communications receiver and transmitter unit, wherein said interface component is co-located with said communications receiver and transmitter unit in association with said vehicle door latch;

an interpreter associated with said interface component and said communications and transmitter unit, wherein said interpreter processes information received from said communications receiver and transmitter unit in order to provide latch diagnostics and functionalities; and a bi-directional communications protocol, which allows for the receiving of latch status and operational information and data during any operational cycles of said vehicle door latch and for allowing the transmitting of any vehicle latch command to said vehicle door latch, thereby permitting active debugging of said vehicle door latch without the use of a vehicle computer.

2. The system of claim 1 wherein said wireless network comprises at least one of the following types of wireless networks: a personal area network, a GSM network, a GPRS network, a CDMA network, a TDMA network, a CDPD network, a WIN network, an 802.11 network, or a wireless communications protocol network.

3. The system of claim 1 wherein said wireless communications component includes an antenna and associated wireless communications circuitry for receiving and transmitting data per a desired frequency, including said bi-directional communications protocol.

4. The system of claim 1 wherein said communications receiver and transmitter unit further comprises a direct wire connection for communicating data to and from said interpreter and wherein said bi-directional communications protocol comprises a general packet format in association with said bi-directional communications protocol, wherein said general packet format comprises at least two different packet types including a debug information packet that provides debug information and a version information packet that provides version information.

5. The system of claim 4 wherein said direct wire connection comprises a voltage level shifter for transforming voltage levels for communication with said interface component.

6. The system of claim 1 wherein:

said bi-directional communications protocol comprises a general packet format in association with said bi-directional communications protocol, wherein said general packet format comprises at least two different packet types including a debug information packet that provides debug information and a version information packet that provides version information; and said interface component comprises a Universal Asynchronous Receiver/Transmitter (UART) which can receive and transmit date serially from said communications receiver and transmitter unit and receive and transmit data in parallel with said interpreter.

7. The system of claim 6 wherein said UART comprises a hardware component separate from said interpreter.

8. The system of claim 6 wherein said UART is integrated with said interpreter.

9. The system of claim 8 wherein said interpreter comprises a microprocessor that processes data received from said UART.

10. The system of claim 8 wherein said interpreter comprises a logic array that performs a particular function based on particular data received from said UART.

11. A vehicle door latch communications system, comprising:

a communications receiver and transmitter unit associated with a vehicle door latch;

an interface component for interfacing with said communications receiver and transmitter unit, wherein said interface component is co-located with said communications receiver and transmitter unit in association with said vehicle door latch;

an interpreter associated with said interface component and said communications and transmitter unit, wherein said interpreter processes information received from said communications receiver and transmitter unit in order to provide latch diagnostics and functionalities for said vehicle door latch, wherein said interpreter comprises a logic array that performs a particular function based on particular data received from said interface component;

a wireless communications component for wirelessly communicating data between said communications receiver and transmitter unit and a host computer via a wireless network; and a bi-directional communications protocol, which allows for the receiving of latch status and operational information and data during any operational cycles of said vehicle door latch and for allowing the transmitting of any vehicle door latch command to said vehicle door latch, thereby permitting active debugging of said vehicle latch without the use of a vehicle computer.

12. The system of claim 11 wherein said interface component comprises a Universal Asynchronous Receiver/transmitter (UART) which can receive and transmit data serially from said communications receiver and transmitter unit and receive and transmit data in parallel with said interpreter.

13. The system of claim 11 wherein said bi-directional communications protocol comprises a general packet format in association with said bi-directional communications protocol, wherein said general packet format comprises at least two different packet types including a debug information packet that provides debug information and a version information packet that provides version information.

14. A vehicle door latch communications method, comprising the steps of:

providing a host computer and a wireless network;

associating a communications receiver and transmitter unit with a vehicle latch, wherein said communications receiver and transmitter unit comprises a wireless communications component for communicating with said host computer via said wireless network;

establishing an interface component for interfacing with said communications receiver and transmitter unit, wherein said interface component is co-located with said communications receiver and transmitter unit in association with said vehicle door latch;

associating an interpreter with said interface component and said communications and transmitter unit, wherein said interpreter processes information received from said communications receiver and transmitter unit in order to provide latch diagnostics and functionalities; and providing a bi-directional communications protocol, which allows for the receiving of latch status and operational information and data during any operational cycles of said vehicle door latch and for allowing the transmitting of any vehicle latch command to said vehicle door latch, thereby permitting active debugging of said vehicle door latch without the use of a vehicle computer.

15. The method of claim 14 further comprising the step of configuring said wireless network to comprise at least one of the following types of wireless networks: a personal area network, a GSM network, a GPRS network, a CDMA network, a TDMA network, a CDPD network, a WIN network, an 802.11 network, or a wireless communications protocol network.

16. The method of claim 14 further comprising the step of configuring said wireless communications component to include an antenna and associated wireless communications circuitry for receiving and transmitting data per a desired frequency.

17. The method of claim 14 wherein further comprising the steps of:

configuring said communications receiver and transmitter unit to further comprise a direct wire connection for communicating data to and from said interpreter; and configuring said bi-directional communications protocol to comprise a general packet format in association with said bi-directional communications protocol, wherein said general packet format comprises at least two different packet types including a debug information packet which provides debug information and a version information packet that provides version information.

18. The method of claim 17 further comprising the step of configuring said direct wire connection to comprise a voltage level shifter for transforming voltage levels for communication with said interface component.

19. The method of claim 14 further comprising the steps of:

configuring said interface component to comprise a Universal Asynchronous Receiver/Transmitter (UART) which can receive and transmit data serially from said communications receiver and transmitter unit and receive and transmit data in parallel with said interpreter; and configuring said bi-directional communications protocol to comprise a general packet format in association with said bi-directional communications protocol, wherein said general packet format comprises at least two different packet types including a debug information packet which provides debug information and a version information packet that provides version information.

20. The method of claim 19 further comprising the step of embedding said interpreter, said UART, and said communications receiver and transmitter unit within said latch, wherein said comprises a vehicle door latch.

* * * * *